United States Patent
Shoener et al.

(10) Patent No.: US 12,031,848 B2
(45) Date of Patent: Jul. 9, 2024

(54) METHOD AND COMPUTING DEVICE FOR DETECTING ANOMALOUS SENSOR DATA

(71) Applicant: Black & Veatch Holding Company, Overland Park, KS (US)

(72) Inventors: Brian Darwin Shoener, Chicago, IL (US); Eric Daniel Redmond, Des Moines, IA (US); Sandeep Sathyamoorthy, Walnut Creek, CA (US)

(73) Assignee: Black & Veatch Holding Company, Overland Park, KS (US)

( * ) Notice: Subject to any disclaimer, the term of this patent is extended or adjusted under 35 U.S.C. 154(b) by 0 days.

(21) Appl. No.: 18/352,418

(22) Filed: Jul. 14, 2023

(65) Prior Publication Data
US 2024/0019282 A1 Jan. 18, 2024

Related U.S. Application Data

(60) Provisional application No. 63/389,667, filed on Jul. 15, 2022.

(51) Int. Cl.
*G01D 18/00* (2006.01)
(52) U.S. Cl.
CPC .................................. *G01D 18/00* (2013.01)
(58) Field of Classification Search
None
See application file for complete search history.

(56) References Cited

U.S. PATENT DOCUMENTS

| | | | |
|---|---|---|---|
| 8,341,106 B1 | 12/2012 | Scolnicov et al. | |
| 2013/0313191 A1* | 11/2013 | Wolf | C02F 9/00 210/638 |

(Continued)

FOREIGN PATENT DOCUMENTS

| | | |
|---|---|---|
| CN | 111708665 | 2/2020 |
| CN | 113419883 | 9/2021 |
| KR | 10-2021-0035363 | 4/2021 |

OTHER PUBLICATIONS

International Search Report and Written Opinion of corresponding PCT Application PCT/US2023/070248 Dated Nov. 6, 2023, 9 pages.

*Primary Examiner* — Brandi N Hopkins
*Assistant Examiner* — Nigel H Plumb
(74) *Attorney, Agent, or Firm* — Hovey Williams LLP (57) ABSTRACT

A computer-implemented method for detecting anomalies in data from a sensor comprises receiving a plurality of data points from the sensor; determining a first anomaly score component, the first anomaly score component varying according to a Cook's Distance value; determining a second anomaly score component, the second anomaly score component varying according to a singular spectrum analysis value; determining a third anomaly score component, the third anomaly score component varying according to a rolling variance rate of change value; determining a fourth anomaly score component, the fourth anomaly score component varying according to whether a current data point is within an upper bound and a lower bound; determining a total anomaly score as a function of the anomaly score components; comparing the total anomaly score to an anomaly score threshold value; and determining the data point is an anomaly if the total anomaly score is greater than the threshold value.

20 Claims, 4 Drawing Sheets

(56) References Cited

U.S. PATENT DOCUMENTS

| | | | |
|---|---|---|---|
| 2019/0354419 A1* | 11/2019 | Matsumoto | G06F 11/0754 |
| 2020/0057706 A1* | 2/2020 | Rome | H04L 63/1425 |
| 2020/0285997 A1 | 9/2020 | Bhattacharyya et al. | |
| 2020/0374720 A1 | 11/2020 | Li et al. | |
| 2021/0224599 A1 | 7/2021 | Tajima et al. | |

* cited by examiner

METHOD AND COMPUTING DEVICE FOR DETECTING ANOMALOUS SENSOR DATA

RELATED APPLICATIONS

The current patent application is a regular utility nonprovisional patent application which claims priority benefit, with regard to all common subject matter, to U.S. Provisional Application Ser. No. 63/389,667, entitled "ANOMALY DETECTION ENGINE", filed Jul. 15, 2022. The earlier-filed application is hereby incorporated by reference, in its entirety, into the current patent application.

FIELD OF THE INVENTION

Embodiments of the current invention relate to methods and computing devices for analyzing data collected from sensors and other measurement devices.

BACKGROUND

Data derived from the measurements of one or more sensors may be used to monitor a variety of parameters including electrical characteristics, such as voltage and current, physical or mechanical properties, such as mass, pressure, flow rates, and velocity, environmental factors, such as temperature and humidity, and the like. In turn, the data may be used to control various system operations and processes. Being able to tell good data from anomalous data is important for quality operational and process control.

SUMMARY OF THE INVENTION

Embodiments of the current invention provide a distinct advance in the art of determining anomalous sensor data. Specifically, embodiments of the current invention provide a method and computing device which utilize four separate processes to analyze the sensor data. Each process focuses on a different aspect of streaming serial data analysis to provide more sophisticated anomaly detection than just one of the processes could provide alone. The method broadly comprises receiving the data from the sensor, the data including a sequence of readings, each reading being a successive one of time-sampled data points having a numeric digital or binary value; for each data point, performing the following steps: determining a first anomaly score component, the first anomaly score component varying according to a Cook's Distance value; determining a second anomaly score component, the second anomaly score component varying according to a singular spectrum analysis value; determining a third anomaly score component, the third anomaly score component varying according to a rolling variance rate of change value; determining a fourth anomaly score component, the fourth anomaly score component varying according to whether a current data point is within an upper bound and a lower bound; determining a total anomaly score as a function of the first anomaly score component, the second anomaly score component, the third anomaly score component, and the fourth anomaly score component; comparing the total anomaly score to an anomaly score threshold value; and determining the data point is an anomaly if the total anomaly score is greater than the threshold value.

The computing device broadly comprises a processing element in electronic communication with a memory element. The processing element is configured or programmed to: receive the data from the sensor, the data including a sequence of readings, each reading being a successive one of time-sampled data points having a numeric digital or binary value; for each data point, perform the following steps: determine a first anomaly score component, the first anomaly score component varying according to a Cook's Distance value; determine a second anomaly score component, the second anomaly score component varying according to a singular spectrum analysis value; determine a third anomaly score component, the third anomaly score component varying according to a rolling variance rate of change value; determine a fourth anomaly score component, the fourth anomaly score component varying according to whether a current data point is within an upper bound and a lower bound; determine a total anomaly score as a function of the first anomaly score component, the second anomaly score component, the third anomaly score component, and the fourth anomaly score component; compare the total anomaly score to an anomaly score threshold value; and determine the data point is an anomaly if the total anomaly score is greater than the threshold value.

Another embodiment of the current invention provides a non-transitory computer-readable medium having stored thereon software instructions for detecting anomalies in data from a sensor. The instructions, when executed by a processing element, cause the processing element to: receive the data from the sensor, the data including a sequence of readings, each reading being a successive one of time-sampled data points having a numeric digital or binary value; for each data point, perform the following steps: determine a first anomaly score component, the first anomaly score component varying according to a Cook's Distance value; determine a second anomaly score component, the second anomaly score component varying according to a singular spectrum analysis value; determine a third anomaly score component, the third anomaly score component varying according to a rolling variance rate of change value; determine a fourth anomaly score component, the fourth anomaly score component varying according to whether a current data point is within an upper bound and a lower bound; determine a total anomaly score as a function of the first anomaly score component, the second anomaly score component, the third anomaly score component, and the fourth anomaly score component; compare the total anomaly score to an anomaly score threshold value; and determine the data point is an anomaly if the total anomaly score is greater than the threshold value.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
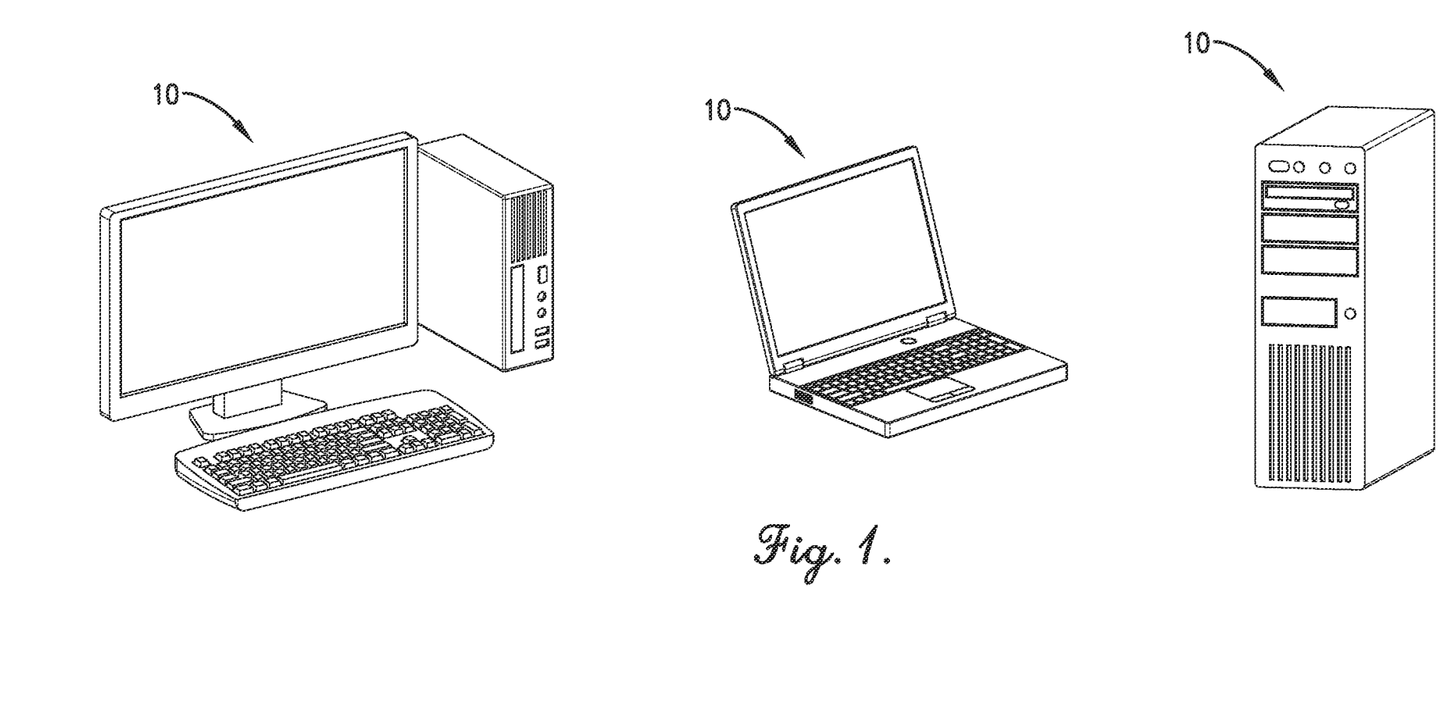
FIG. 1 is a diagram illustrating examples of a computing device, constructed in accordance with various embodiments of the invention, for detecting anomalies in sensor data.
Figure 2:
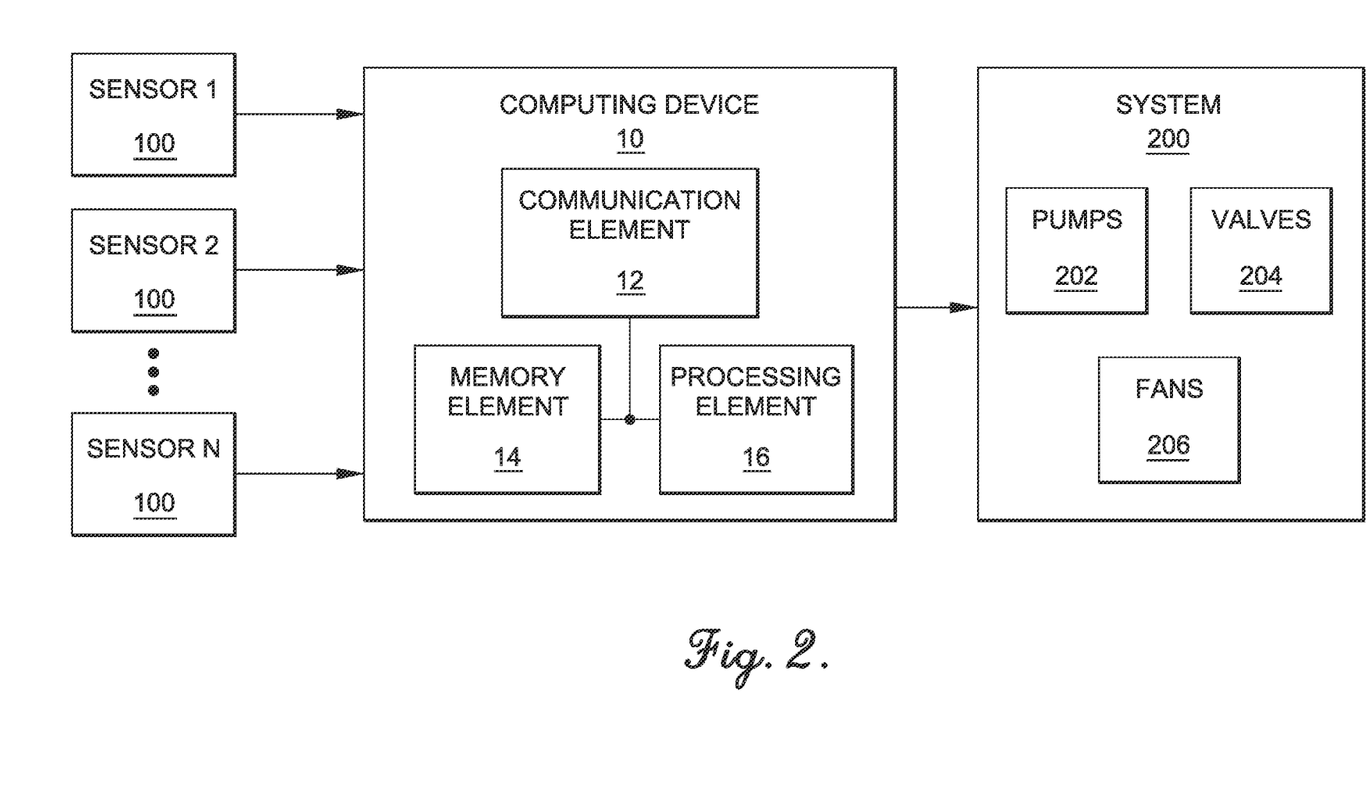
FIG. 2 is a schematic block diagram of the computing device receiving data from one or more sensors and outputting data to a system including a plurality of mechanical components, the computing device including various electronic components.

A computing device 10, constructed in accordance with various embodiments of the current invention, for detecting anomalies in sensor data is shown in FIGS. 1 and 2. The computing device 10 receives data from one or more sensors 100 that measure operational parameters in a water or wastewater treatment facility. The computing device 10 performs in depth analysis on the data to determine any anomalies. Based on the results of the analysis, the computing device 10 outputs data, such as control signals, to a system 200 which controls the operations of various components of the system 200. Although exemplary embodiments of the current invention are presented as being utilized in a water or wastewater treatment facility, the principles of the current invention can be broadly applied to data that is collected or measured in any environment.

Each sensor 100 generally detects and measures one of a plurality of operational parameters. For example, the sensor 100 may detect and measure dynamic parameters such as fluid flow or pressure, chemical or biochemical parameters, or other water or wastewater treatment process parameters. More broadly, the sensor 100 may detect and measure any quantity including temperature, electric voltage, power, torque, speed, and the like. The sensor 100 may include one or more types of sensors such as transducers, ion-selective electrode probes, and so forth. The sensor 100 outputs a reading periodically, wherein each reading is a sampled numeric data value of the measured parameter. For example, the sensor 100 may output a sequence or stream of numbers, in digital or binary form, at a frequency which may be fixed or variable.

The system 200 generally includes a plurality of components which carry out various processes for the system 200. As an example, the system 200 may be utilized with a water or wastewater treatment facility and may include components such as pumps 202, valves 204, fans 206, and the like. The components may control the flow of liquids or fluids through piping and in and out of tanks and so forth.

Referring to FIG. 1, the computing device 10 may be embodied by server computers, workstation computers, desktop computers, laptop computers, palmtop computers, notebook computers, tablets or tablet computers, or the like. Referring to FIG. 2, the computing device 10 broadly comprises a communication element 12, a memory element 14, and a processing element 16. The computing device 10 may further comprise other components, such as a monitor, display, or touchscreen, a keyboard or keypad, a mouse, and so forth which will not be discussed herein in detail.

The communication element 12 generally allows the computing device 10 to communicate with other computing devices, external systems, computing networks, telecommunication networks, the Internet, and the like. The communication element 12 may include signal and/or data transmitting and receiving circuits, such as antennas, amplifiers, filters, mixers, oscillators, digital signal processors (DSPs), and the like. The communication element 12 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the communication element 12 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 12 may establish communication through connectors or couplers that receive metal conductor wires or cables which are compatible with networking technologies such as ethernet. In certain embodiments, the communication element 12 may also couple with optical fiber cables. The communication element 12 may be in electronic communication with the memory element 14 and the processing element 16.

The memory element 14 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 14 may be embedded in, or packaged in the same package as, the processing element 16. The memory element 14 may include, or may constitute, a non-transitory "computer-readable medium". The memory element 14 may store the instructions, code, code statements, code segments, software, firmware, programs, applications, apps, services, daemons, or the like that are executed by the processing element 16. The memory element 14 may also store data that is received by the processing element 16 or the device in which the processing element 16 is implemented. The processing element 16 may further store data or intermediate results generated during processing, calculations, and/or computations as well as data or final results after processing, calculations, and/or computations. In addition, the memory element 14 may store settings, text data, documents from word processing software, spreadsheet software and other software applications, sampled audio sound files, photograph or other image data, movie data, databases, and the like.

The processing element 16 may comprise one or more processors. The processing element 16 may include electronic hardware components such as microprocessors (single-core or multi-core), microcontrollers, digital signal processors (DSPs), field-programmable gate arrays (FPGAs), analog and/or digital application-specific integrated circuits (ASICs), intelligence circuitry, or the like, or combinations thereof. The processing element 16 may generally execute, process, or run instructions, code, code segments, code statements, software, firmware, programs, applications, apps, processes, services, daemons, or the like. The processing element 16 may also include hardware components such as registers, finite-state machines, sequential and combinational logic, configurable logic blocks, and other electronic circuits that can perform the functions necessary for the operation of the current invention. In certain embodiments, the processing element 16 may include multiple computational components and functional blocks that are packaged separately but function as a single unit. In some embodiments, the processing element 16 may further include multiprocessor architectures, parallel processor architectures, processor clusters, and the like, which provide high performance computing. The processing element 16 may be in electronic communication with the other electronic components of the computing device 10 through serial or parallel links that include universal busses, address busses, data busses, control lines, and the like. In addition, the processing element 16 may include ADCs to convert analog electronic signals to (streams of) digital data values and/or digital to analog converters (DACs) to convert (streams of) digital data values to analog electronic signals.

The processing element 16 may be operable, configured, and/or programmed to perform the following functions, operations, processes, methods, and/or algorithms by utilizing hardware, software, firmware, or combinations thereof. Other components, such as the communication element 12 and the memory element 14 may be utilized as well.

Figure 3:
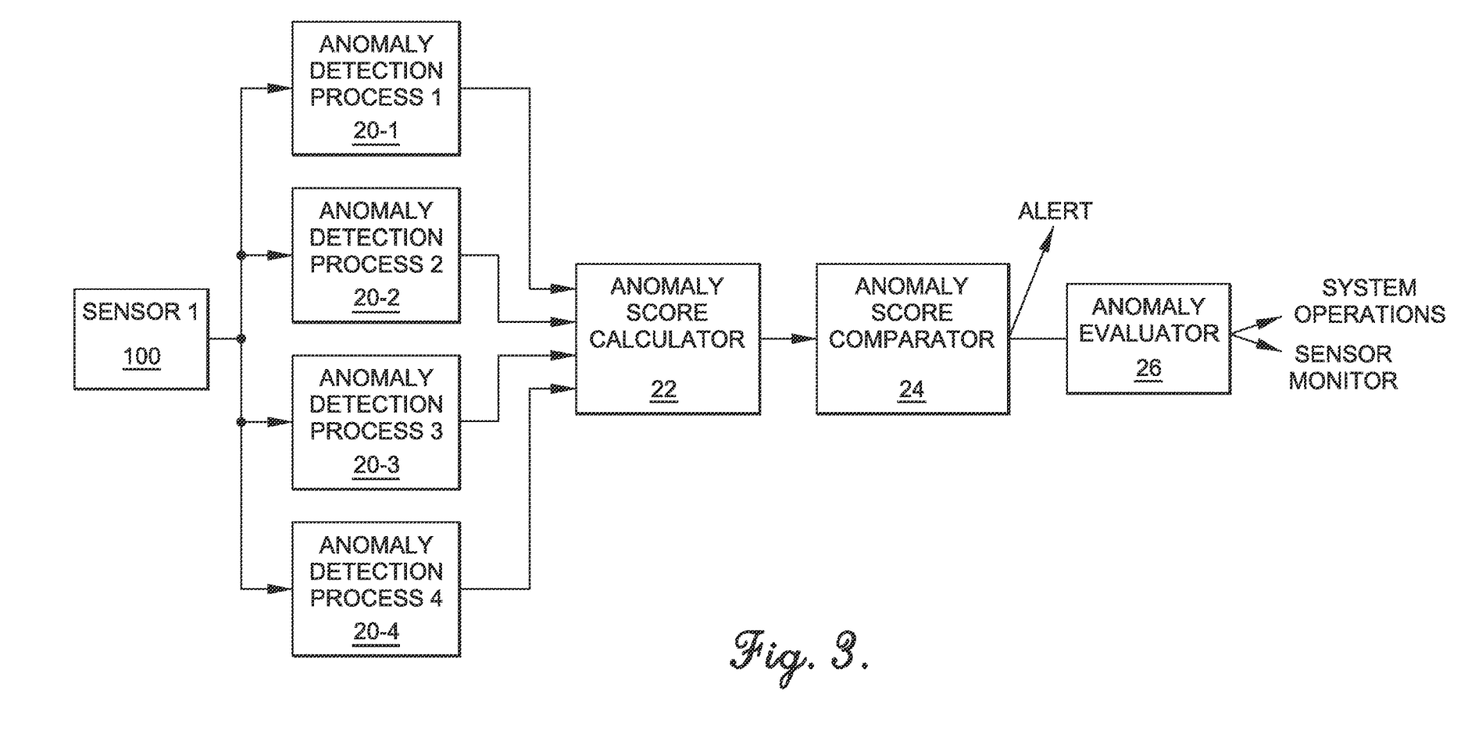
FIG. 3 is a schematic block diagram of various software processes executed by the computing device.

The processing element 16 receives the stream or sequence of readings from the sensor 100, wherein each reading is a successive one of time-sampled data points having a numeric digital or binary value. Referring to FIG. 3, the processing element 16 executes a plurality of anomaly detection processes 20 which receive and process the data points, an anomaly score calculator 22, an anomaly score comparator 24, and an anomaly evaluator 26. The anomaly detection processes 20 include a first anomaly detection process 20-1, a second anomaly detection process 20-2, a third anomaly detection process 20-3, and a fourth anomaly detection process 20-4. Each anomaly detection process 20 calculates or determines an anomaly score component. In addition, each anomaly detection process 20 may utilize artificial intelligence techniques or algorithms that require a training or learning phase. The anomaly score calculator 22 determines a total anomaly score. The anomaly score comparator 24 compares the total anomaly score to a threshold and determines whether a given data point is an anomaly. The anomaly evaluator 26 determines potential actions to be taken based on a large number of data points being tagged as anomalous.

The first anomaly detection process 20-1 calculates a first anomaly score component (ASC1) that varies according to a Cook's Distance value. The Cook's Distance determination evaluates an influence of a current data point on a linear regression for data points that includes the current data point and a window of successive previous data points. The first anomaly detection process 20-1 includes the following steps, although variations to the steps may be performed. A first linear regression, such as a least-squares linear regression, is determined on a window of n data points that includes data points at the times t (the current data point), t−1 (the most recent previous data point), t−2, . . . , t−(n−1). The result of the linear regression may be an equation of a line that "fits" the data points. A second linear regression is determined on the window of data points which excludes the current data point. The Cook's Distance D for the current data point is determined by the following exemplary equation, EQ. 1.

$$D_i = \frac{\sum_{j=1}^{n}(\hat{y}_j - \hat{y}_{j(i)})^2}{ps^2} \quad \text{EQ. 1}$$

wherein $\hat{y}_j$ is the first linear regression value for the data point at j, $\hat{y}_{j(i)}$ is the second linear regression value for the data point at j when data point i is removed, p is the number of covariates or predictors for each data point, and $s^2$ is the mean squared error of the linear regression model. The Cook's Distance may also be determined for each of the remaining data points in the window. The first anomaly score component is determined as one of a plurality of integer values as a function of, according to, or based on, the Cook's Distance value for the current data point. For example, the integer values include 0, 1, 2, 3, and 4. The first anomaly score component is equal to 0 if the Cook's Distance has a value within a first range of values, known as "cutoff" values. The first anomaly score component is equal to 1 if the Cook's Distance has a value within a second range of cutoff values. The first anomaly score component is equal to 2 if the Cook's Distance has a value within a third range of cutoff values. The first anomaly score component is equal to 3 if the Cook's Distance has a value within a fourth range of cutoff values. The first anomaly score component is equal to 4 if the Cook's Distance has a value within a fifth range of cutoff values. The degree, or level, of the current data point being an outlier varies with the value of the first anomaly score component, wherein 0 indicates that the current data point is not an outlier and 4 indicates that the current data point is a very extreme outlier. In other embodiments, the first anomaly score component may have a greater number or a lesser number of values.

The values of the ranges of the cutoff values and the window size, or number of data points included in the window, may be determined during a training period before implementing the first anomaly detection process 20-1 and may vary over time. An optimal window size may be determined through examination of the distribution of Cook's Distances for a range of window sizes. The selection is determined based on a balancing between reducing false-outlier detection and identification of true outliers. Other equations and approaches to determine the Cook's Distance Score are possible. Additional description of the Cook's Distance Score can be found in Cook, R. Dennis, (1977) "Detection of Influential Observation in Linear Regression". Technometrics, Vol. 19, No. 1, pp. 15-18, which is hereby incorporated by reference into the current document.

The second anomaly detection process 20-2 calculates a second anomaly score component (ASC2) that varies according to a singular spectrum analysis value. The singular spectrum analysis decomposes a time series waveform formed from the data points into simpler waveforms in a process that removes noise from the underlying signal (i.e., the output of the sensor 100). The actual value of the data point is compared to the value of the simpler waveform to determine whether the data point is an anomaly. The second anomaly detection process 20-2 includes the following steps, although variations to the steps may be performed. A trajectory matrix (X) is formed or created which includes a plurality of first data points arranged in rows of the matrix X, wherein each row includes a window (W) number of columns. The data points are arranged in the rows of the matrix X such that the matrix X is a Hankel type of matrix. A test matrix (Z) is formed or created which includes a plurality of second data points arranged in rows of the matrix Z, wherein each row includes the window W number of columns, but the matrix Z includes a different number of rows from the matrix X. The first data points typically includes a first set of previous data points, and the second data points includes a second set of previous data points that overlap with the first set—meaning that some of the data points in the first set are also in the second set. The two matrices X and Z are transposed to create $X^T$ and $Z^T$. A singular value decomposition (SVD) is performed on the two transposed matrices $X^T$ and $Z^T$, which creates a U matrix ($U_X$ and $U_Z$), a V matrix, and a $\Sigma$ matrix for each transposed matrix $X^T$ and $Z^T$—although the V matrix and the $\Sigma$ matrix are ignored. The U matrices $U_X$ and $U_Z$ are truncated by removing a portion of the columns (i.e., a portion of the last columns) from each matrix to create $\hat{U}_X$ and $\hat{U}_Z$. A product of a transpose of the first truncated matrix $\hat{U}_X^T$ and the second truncated matrix $\hat{U}_Z$ is calculated to create $\hat{U}_X^T\hat{U}_Z$. A singular value decomposition (SVD) is performed on the product $\hat{U}_X^T\hat{U}_Z$, which creates another U matrix, another V matrix, and another $\Sigma$ matrix ($\Sigma_2$)—although the U matrix and the V matrix are ignored. The first value of the $\Sigma_2$ matrix is extracted to create "s". The second anomaly score component is determined as 1−s.

The value of the window W and the number of rows of the trajectory matrix X and the test matrix Z may be determined during a training period before implementing the second anomaly detection process 20-2 and may vary over time.

The third anomaly detection process 20-3 calculates a third anomaly score component (ASC3) by calculating a rolling variance rate of change, that evaluates how the variance of a window of data points changes as new data points are included and the window shifts or "rolls". The third anomaly score component varies according to a value of the rate of change. The third anomaly detection process 20-3 includes the following steps, although variations to the steps may be performed. A window of N data points is formed, wherein the window includes the current data and the N−1 previous data points. A first variance of the window of data points with reference to the current data point is calculated. For example, if N=10 data points, then the first variance is calculated for the group of data points including the current data point and the previous nine (9) data points. The first variance is compared to a second variance that was previously calculated with reference to the previous data point. That is, the second variance is calculated for the group of data points including the previous data point and the nine (9) data points before that. The comparison involves generating a difference between the first variance and the second variance, that is, the first variance minus the second variance. The third anomaly score component is determined as one of a plurality of integer values as a function of, according to, or based on, the difference of the variances. In a manner similar to determination of the first anomaly score component, the third anomaly score component is equal to 0 if the difference has a value within a first range of cutoff values. The third anomaly score component is equal to 1 if the difference has a value within a second range of cutoff values. The third anomaly score component is equal to 2 if the difference has a value within a third range of cutoff values. The third anomaly score component is equal to 3 if the difference has a value within a fourth range of cutoff values. The third anomaly score component is equal to 4 if the difference has a value within a fifth range of cutoff values. The degree, or level, of the current data point being an outlier varies with the value of the third anomaly score component, wherein 0 indicates that the current data point is not an outlier and 4 indicates that the current data point is a very extreme outlier. In other embodiments, the third anomaly score component may have a greater number or a lesser number of values.

The window size N may be determined during a training period before implementing the third anomaly detection process 20-3 and may vary over time.

The fourth anomaly detection process 20-4 calculates a fourth anomaly score component (ASC4) by determining whether the current data point is within Hoeffding's bounds, that determines an upper bound and a lower bound of values within which a current data point is expected based on a history of the previous data points. The fourth anomaly detection process 20-4 is used to detect a drift in the output of the sensor 100. The fourth anomaly detection process 20-4 includes the following steps, although variations to the steps may be performed. The current data point is analyzed to determine whether its value is within a range of values that has an upper bound and a lower bound. The upper and lower bound values are determined using a Hoeffding's bounds criteria, although other criteria for determining the bounds may be utilized. The Hoeffding's bounds are discussed in the document: "Probability inequalities for sums of bounded random variables"; Journal of the American Statistical Association. 58 (301): 13-30, which is incorporated by reference, in its entirety, into the current patent application, except where inconsistent with the teachings of the current patent application. Furthermore, the upper and lower bound values are updated after each current data point. If the current data point is within the range, then no action is taken and the fourth anomaly score component is equal to 0. If the current data point is not within the range (either greater than the upper bound or less than the lower bound), then the current data point is flagged as an anomaly. The current data point is also included in, or added to, a first rolling time window and a second rolling time window. The first rolling time window is defined by a shorter time period than the second rolling time window. For example, the first rolling time window may be defined as an eight-hour time period, and the second rolling time window may be defined as a twenty-four-hour time period. Furthermore, each rolling time window is defined from the current time backwards and shifts as time passes. For example, if the current time is 8:00 pm, then the first rolling time window includes all of the time back to 12:00 pm. If the current time is 8:01 pm, then the first rolling time window includes all of the time back to 12:01 pm. Likewise for the second rolling time window. If the number of flagged data point anomalies within the first rolling time window exceeds a first rolling time window threshold value, then the fourth anomaly score component is equal to 1. Otherwise, the fourth anomaly score component is equal to 0. The fourth anomaly score component remains equal to 1 until there are no flagged data point anomalies in the second rolling time window.

The time periods for the first rolling time window and the second rolling time window as well as the threshold value may be determined during a training period before implementing the fourth anomaly detection process 20-4 and may vary over time.

When the anomaly score component from each anomaly detection process 20 is determined, the anomaly score components are received by the anomaly score calculator 22 which determines the total anomaly score (TAS). The total anomaly score is determined or calculated as a function, or a weighted function, of the first anomaly score component, the second anomaly score component, the third anomaly score component, and the fourth anomaly score component. In exemplary embodiments, the total anomaly score is determined by the following equation, EQ. 2.

$$TAS=((w1 \times ASC1)+(w2 \times ASC2)) \times (w3 \times ASC3)+(w4 \times ASC4) \qquad \text{EQ. 2}$$

wherein w1, w2, w3, and w4 are weights, or hyperparameters, which are determined during a training period before implementing the anomaly score calculator 22 and may vary over time.

The anomaly score comparator 24 receives the total anomaly score from the anomaly score calculator 22 and compares the total anomaly score to an anomaly score threshold. If the total anomaly score is greater than the anomaly score threshold, then the current data point is determined to be an anomaly. If the total anomaly score is less than or equal to the anomaly score threshold, then the current data point is not an anomaly. The computing device 10 may store the values of the data points or may communicate the values of the data points to another data storage system. In some embodiments, metadata may be added to the data points. For example, a single bit column, flag, or register may be included with the value of each data point, wherein the column indicates whether the data point was determined to be an anomaly or not. In addition, the anomaly score comparator 24 may output an alert, such as an on-screen message on a computer display, a text message, an email, an audible sound, or the like, when the current data point is determined to be an anomaly.

In some instances, the data point determined to be anomalous may be disregarded by the system 200 or other processes that analyze or evaluate sensor data. Thus, if the data point was simply erroneous and not an indication of actual conditions, then it will be ignored.

The anomaly evaluator 26 receives the output of the anomaly score comparator 24, that is, whether the current data point was determined to be an anomaly or not. The anomaly evaluator 26 evaluates whether some issue other than just occasional anomalous data is occurring. The anomaly evaluator 26 stores a first count which includes the consecutive anomalous data points and stores a second count which includes the total anomalous data points over a certain time period, wherein the time period may include, for example, one hour, one day, one week, or the like. If the current data point was determined to be an anomaly, then the anomaly evaluator 26 increments the first count and/or the second count appropriately. A large value of either consecutive anomalous data points or total anomalous data points may indicate that a problem other than just anomalous data is occurring. The anomaly evaluator 26 compares the first count to one or more first anomaly count thresholds, one threshold for each process of the system 200 to which the sensor data is related. Some processes may have the same threshold. If the first count exceeds any of the first anomaly thresholds, then the anomaly evaluator 26 sends an alert to the corresponding, appropriate system processes. In response, one or more operating parameters of the processes may be changed. For example, a physical action is taken, such as pumps 202 or fans 206 may be shut off (or turned on), one or more valves 204 may be closed (or opened), or similar physical actions. The anomaly evaluator 26 compares the second count to a second anomaly count threshold. A large second count may indicate a system process issue or it may indicate a problem with the sensor 100. If the second count exceeds the second count anomaly threshold, then the anomaly evaluator 26 sends an alert to a sensor monitor or the anomaly evaluator 26 generates an on-screen message on a computer display, a text message, an email, an audible sound, or the like, to prompt a check of the sensor 100 for calibrating, potential cleaning, or replacing. In some embodiments, the sensor 100 may automatically be deactivated until it can be inspected.

Figure 4:
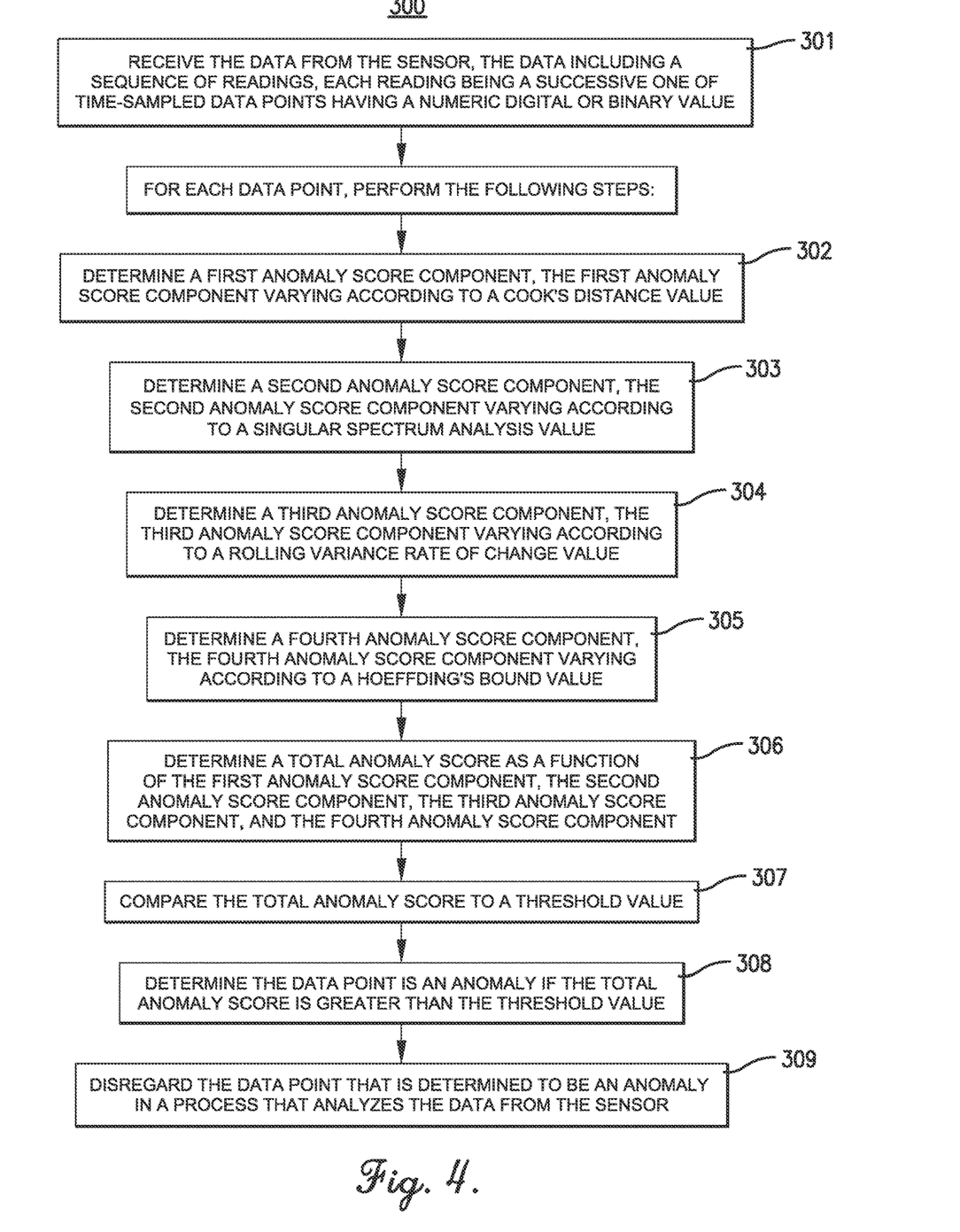
FIG. 4 includes a listing of at least a portion of the steps of a method for detecting anomalies in sensor data.

FIG. 4 depicts a listing of at least a portion of the steps of an exemplary computer-implemented method 300 for detecting anomalies in data from a sensor. Variations to the steps may be performed. The steps may be performed in the order shown in FIG. 4, or they may be performed in a different order. Furthermore, some steps may be performed concurrently as opposed to sequentially. In addition, some steps may be optional or may not be performed. The steps may be performed by the processing element 16 of the computing device 10 via hardware, software, firmware, or combinations thereof. Also, the steps may be implemented as instructions, code, code segments, code statements, a program, an application, an app, a process, a service, a daemon, or the like, and may be stored on a computer-readable storage medium, such as the memory element 14.

Referring to step 301, data is received from the sensor 100. The sensor 100 generally detects and measures one of a plurality of operational parameters. The sensor outputs a reading periodically, wherein each reading is a sampled numeric data value of the measured parameter. The data is received as a successive one of time-sampled data points having a numeric digital or binary value.

For each data point, the following steps are performed.

Referring to step 302, a first anomaly score component (ASC1) is determined, wherein the first anomaly score component varies according to a Cook's Distance value. The first anomaly score component may be determined as follows. A first linear regression, such as a least-squares linear regression, is determined on a window of n data points that includes data points at the times t (the current data point), t−1 (the most recent previous data point), t−2, . . . , t−(n−1). The result of the linear regression may be an equation of a line that "fits" the data points. A second linear regression is determined on the window of data points which excludes the current data point. The Cook's Distance D for the current data point is determined by the equation EQ. 1. The Cook's Distance may also be determined for each of the remaining data points in the window. The first anomaly score component is determined as one of a plurality of integer values as a function of, according to, or based on, the Cook's Distance value for the current data point. For example, the integer values include 0, 1, 2, 3, and 4. The first anomaly score component is equal to 0 if the Cook's Distance has a value within a first range of values, known as "cutoff" values. The first anomaly score component is equal to 1 if the Cook's Distance has a value within a second range of cutoff values. The first anomaly score component is equal to 2 if the Cook's Distance has a value within a third range of cutoff values. The first anomaly score component is equal to 3 if the Cook's Distance has a value within a fourth range of cutoff values. The first anomaly score component is equal to 4 if the Cook's Distance has a value within a fifth range of cutoff values. The degree, or level, of the current data point being an outlier varies with the value of the first anomaly score component, wherein 0 indicates that the current data point is not an outlier and 4 indicates that the current data point is a very extreme outlier. In other embodiments, the first anomaly score component may have a greater number or a lesser number of values.

Referring to step 303, a second anomaly score component (ASC2) is determined, wherein the second anomaly score component varies according to a singular spectrum analysis value. The second anomaly score component may be determined as follows. A trajectory matrix (X) is formed or created which includes a first plurality of the data points arranged in rows of the matrix X, wherein each row includes a window (W) number of columns. The data points are arranged in the rows of the matrix X such that the matrix X is a Hankel type of matrix. A test matrix (Z) is formed or created which includes a second plurality of the data points arranged in rows of the matrix Z, wherein each row includes the window W number of columns, but the matrix Z includes a different number of columns from the matrix X. The two matrices X and Z are transposed to create $X^T$ and $Z^T$. A singular value decomposition (SVD) is performed on the two transposed matrices $X^T$ and $Z^T$, which creates a U matrix ($U_X$ and $U_Z$), a V matrix, and a Σ matrix for each transposed matrix $X^T$ and $Z^T$—although the V matrix and the Σ matrix are ignored. The U matrices $U_X$ and $U_Z$ are truncated by extracting only a portion of the columns (i.e., the first n columns) from each matrix to create Ox and Oz. A product of a transpose of the first truncated matrix $\hat{U}_X^T$ and the second truncated matrix Oz is calculated to create $\hat{U}_X^T \hat{U}_Z$. A singular value decomposition (SVD) is performed on the product $\hat{U}_X^T \hat{U}_Z$, which creates another U matrix, another V matrix, and another Σ matrix ($Σ_2$)—although the U matrix and the V matrix are ignored. The first value of the $Σ_2$ matrix is extracted to create "s". The second anomaly score component is determined as 1-s.

Referring to step 304, a third anomaly score component (ASC3) is determined, wherein the third anomaly score component varies according to a rolling variance rate of change value. The third anomaly score component may be determined as follows. A window of N data points is formed, wherein the window includes the current data and the N−1 previous data points. A first variance of the window of data points with reference to the current data point is calculated. For example, if N=10 data points, then the first variance is calculated for the group of data points including the current data point and the previous nine (9) data points. The first variance is compared to a second variance that was previously calculated with reference to the previous data point. That is, the second variance is calculated for the group of data points including the previous data point and the nine (9) data points before that. The comparison involves generating a difference between the first variance and the second variance, that is, the first variance minus the second variance. The third anomaly score component is determined as one of a plurality of integer values as a function of, according to, or based on, the difference of the variances. In a manner similar to determination of the first anomaly score component, the third anomaly score component is equal to 0 if the difference has a value within a first range of cutoff values. The third anomaly score component is equal to 1 if the difference has a value within a second range of cutoff values. The third anomaly score component is equal to 2 if the difference has a value within a third range of cutoff values. The third anomaly score component is equal to 3 if the difference has a value within a fourth range of cutoff values. The third anomaly score component is equal to 4 if the difference has a value within a fifth range of cutoff values. The degree, or level, of the current data point being an outlier varies with the value of the third anomaly score component, wherein 0 indicates that the current data point is not an outlier and 4 indicates that the current data point is a very extreme outlier. In other embodiments, the third anomaly score component may have a greater number or a lesser number of values.

Referring to step 305, a fourth anomaly score component (ASC4) is determined, wherein the fourth anomaly score component varies according to whether the current data point is within Hoeffding's bounds. The fourth anomaly score component may be determined as follows. The current data point is analyzed to determine whether its value is within a range of values that has an upper bound and a lower bound. The upper and lower bound values are determined using a Hoeffding's bounds criteria, although other criteria for determining the bounds may be utilized. Furthermore, the upper and lower bound values are updated with each current data point. If the current data point is within the range, then no action is taken and the fourth anomaly score component is equal to 0. If the current data point is not within the range (either greater than the upper bound or less than the lower bound), then the current data point is flagged as an anomaly. The current data point is also included in, or added to, a first rolling time window and a second rolling time window. The first rolling time window is defined by a shorter time period than the second rolling time window. For example, the first rolling time window may be defined as an eight-hour time period, and the second rolling time window may be defined as a twenty-four-hour time period. Furthermore, each rolling time window is defined from the current time backwards and shifts as time passes. For example, if the current time is 8:00 pm, then the first rolling time window includes all of the time back to 12:00 pm. If the current time is 8:01 pm, then the first rolling time window includes all of the time back to 12:01 pm. Likewise for the second rolling time window. If the number of flagged data point anomalies within the first rolling time window exceeds a threshold value, then the fourth anomaly score component is equal to 1. Otherwise, the fourth anomaly score component is equal to 0. The fourth anomaly score component remains equal to 1 until there are no flagged data point anomalies in the second rolling time window.

Referring to step 306, a total anomaly score (TAS) is determined, wherein the total anomaly score is a function of the first anomaly score component, the second anomaly score component, the third anomaly score component, and the fourth anomaly score component. The total anomaly score is calculated using the equation EQ. 2.

Referring to steps 307 and 308, the total anomaly score is compared to an anomaly score threshold. If the total anomaly score is greater than the anomaly score threshold, then the current data point is determined to be an anomaly. If the total anomaly score is less than or equal to the anomaly score threshold, then the current data point is not an anomaly. The computing device 10 may store the values of the data points or may communicate the values of the data points to another data storage system. In some embodiments, metadata may be added to the data points. For example, a single bit column, flag, or register may be included with the value of each data point, wherein the column indicates whether the data point was determined to be an anomaly or not. In addition, the anomaly score comparator 24 may output an alert, such as an on-screen message on a computer display, a text message, an email, an audible sound, or the like, when the current data point is determined to be an anomaly.

Referring to step 309, the data point is disregarded by the system 200 or other processes that analyze or evaluate sensor data if the data point is determined to be anomalous.

The following additional steps of the method 300 may be performed as well. The anomaly evaluator 26 receives the output of the anomaly score comparator 24, that is, whether the current data point was determined to be an anomaly or not. The anomaly evaluator 26 evaluates whether some issue other than just occasional anomalous data is occurring. The anomaly evaluator 26 stores a first count which includes the consecutive anomalous data points and stores a second count which includes the total anomalous data points over a certain time period, wherein the time period may include, for example, one hour, one day, one week, or the like. If the current data point was determined to be an anomaly, then the anomaly evaluator 26 increments the first count and/or the second count appropriately. A large value of either consecutive anomalous data points or total anomalous data points may indicate that a problem other than just anomalous data is occurring. The anomaly evaluator 26 compares the first count to one or more first anomaly count thresholds, one threshold for each process of the system 200 to which the sensor data is related. Some processes may have the same threshold. If the first count exceeds any of the first count anomaly thresholds, then the anomaly evaluator 26 sends an alert to the corresponding, appropriate system processes. In response, one or more operating parameters of the processes may be changed. For example, a physical action is taken, such as pumps 202 or fans 206 may be shut off (or turned on), one or more valves 204 may be closed (or opened), or similar physical actions. The anomaly evaluator 26 compares the second count to a second anomaly count threshold. A large second count may indicate a system process issue or it may indicate a problem with the sensor 100. If the second count exceeds the second count anomaly threshold, then the anomaly evaluator 26 sends an alert to a sensor monitor or the anomaly evaluator 26 generates an on-screen message on a computer display, a text message, an email, an audible sound, or the like, to prompt a check of the sensor 100 for calibrating, potential cleaning, or replacing. In some embodiments, the sensor 100 may automatically be deactivated until it can be inspected.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A computer-implemented method for detecting anomalies in data from a sensor, the method comprising:
    receiving the data from the sensor, the data including a sequence of readings, each reading being a successive one of time-sampled data points having a numeric digital or binary value;
    for each data point, performing the following steps:
    determining a first anomaly score component, the first anomaly score component varying according to a Cook's Distance value;
    determining a second anomaly score component, the second anomaly score component varying according to a singular spectrum analysis value;
    determining a third anomaly score component, the third anomaly score component varying according to a rolling variance rate of change value;
    determining a fourth anomaly score component, the fourth anomaly score component varying according to whether a current data point is within an upper bound and a lower bound;
    determining a total anomaly score as a function of the first anomaly score component, the second anomaly score component, the third anomaly score component, and the fourth anomaly score component;
    comparing the total anomaly score to an anomaly score threshold value; and
    determining the data point is an anomaly if the total anomaly score is greater than the threshold value.

2. The computer-implemented method of claim 1, further comprising determining the data point is not an anomaly if the total anomaly score is less than or equal to the threshold value.

3. The computer-implemented method of claim 1, further comprising disregarding the data point that is determined to be an anomaly in a system that analyzes the data from the sensor.

4. The computer-implemented method of claim 1, further comprising changing one or more operating parameters of a system process if a plurality of consecutive data points are determined to be anomalies.

5. The computer-implemented method of claim 4, wherein the system process utilizes components selected from the group consisting of a pump, a valve, and a fan, and the operating parameters are selected from the group consisting of a pump operating state, a valve position, and a fan operating state.

6. The computer-implemented method of claim 1, further comprising deactivating the sensor if a plurality of data points are determined to be anomalies over a period of time.

7. The computer-implemented method of claim 1, further comprising calibrating the sensor if a plurality of data points are determined to be anomalies over a period of time.

8. The computer-implemented method of claim 1, wherein determining the first anomaly score component includes
   determining a first linear regression on a window of data points that includes the current data point,
   determining a second linear regression on the window of data points that excludes the current data point,
   determining the Cook's Distance value for the current data point as a function of the first linear regression and the second linear regression, and
   determining the first anomaly score component as one of a plurality of integer values according to the Cook's Distance value.

9. The computer-implemented method of claim 1, wherein determining the second anomaly score component includes
   forming a trajectory matrix which includes a plurality of first data points arranged in a first number of rows and a first number of columns,
   forming a test matrix which includes a plurality of second data points arranged in a second number of rows and the first number of columns,
   transposing the trajectory matrix and the test matrix,
   performing singular value decomposition on each of the trajectory matrix and the test matrix to form a trajectory U matrix and a test U matrix, truncating the trajectory U matrix and the test U matrix by removing a portion of
   the columns of each matrix,
   transposing the truncated trajectory U matrix,
   multiplying the transposed truncated trajectory U matrix by the truncated test U matrix,
   performing singular value decomposition on the product of the transposed truncated U trajectory matrix and the truncated U test matrix to form a sigma matrix,
   extracting a first value of the sigma matrix, and
   determining the second anomaly score component as a difference between 1 and the first value of the sigma matrix.

10. The computer-implemented method of claim 1, wherein determining the third anomaly score component includes
    forming a first window of data points that includes the current data point and a first plurality of previous data points,
    calculating a first variance of the first window of data points,
    forming a second window of data points that includes the data point prior to the current data point and a second plurality of previous data points,
    calculating a second variance of the second window of data points,
    calculating a difference between the first variance and the second variance, and
    determining the third anomaly score component as one of a plurality of integer values according to the difference between the first variance and the second variance.

11. The computer-implemented method of claim 1, wherein determining the fourth anomaly score component includes
    determining whether the value of the current data point is within the upper bound and the lower bound as determined by Hoeffding's bounds,
    updating the values of the upper bound and the lower bound after each current data point is received,
    setting the fourth anomaly score component to 0 if the value of the current data point is within the upper bound and the lower bound,
    performing the following steps if the value of the current data point is not within the upper bound and the lower bound,
    including the current data point as an anomalous data point in a first rolling time window and a second rolling time window,
    comparing a number of anomalous data points in the first rolling time window to a first rolling time window threshold value,
    setting the fourth anomaly score component to 0 if the number of anomalous data points in the first rolling time window is less than or equal to the first rolling time window threshold value,
    setting the fourth anomaly score component to 1 if the number of anomalous data points in the first rolling time window is greater than the first rolling time window threshold value,
    maintaining the value of the fourth anomaly score component at 1 until there are no anomalous data points in the second rolling time window, and
    shifting the first rolling time window and the second rolling time window as time passes.

12. The computer-implemented method of claim 1, wherein determining the total anomaly score includes
    calculating a first weighted component as a first weight times the first anomaly score component,
    calculating a second weighted component as a second weight times the second anomaly score component,
    calculating a third weighted component as a third weight times the third anomaly score component,
    calculating a fourth weighted component as a fourth weight times the fourth anomaly score component, and
    calculating the total anomaly score as a sum of the first weighted component and the second weighted component times the third weighted component plus the fourth weighted component.

13. A computing device for detecting anomalies in data from a sensor, the computing device comprising:
    a processing element in electronic communication with a memory element, the processing element configured or programmed to:
      receive the data from the sensor, the data including a sequence of readings, each reading being a successive one of time-sampled data points having a numeric digital or binary value;
      for each data point, perform the following steps:
      determine a first anomaly score component, the first anomaly score component varying according to a Cook's Distance value;
      determine a second anomaly score component, the second anomaly score component varying according to a singular spectrum analysis value;
      determine a third anomaly score component, the third anomaly score component varying according to a rolling variance rate of change value;
      determine a fourth anomaly score component, the fourth anomaly score component varying according to whether a current data point is within an upper bound and a lower bound;
      determine a total anomaly score as a function of the first anomaly score component, the second anomaly score component, the third anomaly score component, and the fourth anomaly score component;

compare the total anomaly score to an anomaly score threshold value; and determine the data point is an anomaly if the total anomaly score is greater than the threshold value.

14. The computing device of claim 13, wherein the processing element is further configured or programed to determine the data point is not an anomaly if the total anomaly score is less than or equal to the threshold value.

15. The computing device of claim 13, wherein the processing element is further configured or programed to change one or more operating parameters of a system process if a plurality of consecutive data points are determined to be anomalies.

16. The computing device of claim 13, wherein the processing element is further configured or programed to deactivate the sensor if a plurality of data points are determined to be anomalies over a period of time.

17. A non-transitory computer-readable medium having stored thereon software instructions for detecting anomalies in data from a sensor that, when executed by a processing element, cause the processing element to:

receive the data from the sensor, the data including a sequence of readings, each reading being a successive one of time-sampled data points having a numeric digital or binary value;

for each data point, perform the following steps:

determine a first anomaly score component, the first anomaly score component varying according to a Cook's Distance value;

determine a second anomaly score component, the second anomaly score component varying according to a singular spectrum analysis value;

determine a third anomaly score component, the third anomaly score component varying according to a rolling variance rate of change value;

determine a fourth anomaly score component, the fourth anomaly score component varying according to whether a current data point is within an upper bound and a lower bound;

determine a total anomaly score as a function of the first anomaly score component, the second anomaly score component, the third anomaly score component, and the fourth anomaly score component;

compare the total anomaly score to an anomaly score threshold value; and determine the data point is an anomaly if the total anomaly score is greater than the threshold value.

18. The non-transitory computer-readable medium of claim 17, wherein the processing element is further caused to determine the data point is not an anomaly if the total anomaly score is less than or equal to the threshold value.

19. The non-transitory computer-readable medium of claim 17, wherein the processing element is further caused to change one or more operating parameters of a system process if a plurality of consecutive data points are determined to be anomalies.

20. The non-transitory computer-readable medium of claim 17, wherein the processing element is further caused to deactivate the sensor if a plurality of data points are determined to be anomalies over a period of time.

* * * * *